017
United States Patent [19]

Ayres et al.

[11] Patent Number: 4,983,406

[45] Date of Patent: Jan. 8, 1991

[54] PRESERVATION OF FEED

[75] Inventors: James W. Ayres; William E. Sandine, both of Corvallis; Richard B. Parker, Portland, all of Oreg.

[73] Assignees: Wesman Foods, Inc., Beaverton; The State of Oregon acting by and through the State Board of Higher Education on behalf of Oregon State University, Eugene, both of Oreg. ; a part interest to each

[21] Appl. No.: 343,948

[22] Filed: Apr. 25, 1989

[51] Int. Cl.$^5$ .............................................. A23K 3/00
[52] U.S. Cl. .......................................... 426/9; 426/53; 426/54; 426/335; 426/623; 426/532; 426/636; 426/807
[58] Field of Search ...................... 426/9, 53, 54, 335, 426/532, 807, 623, 636

[56] References Cited

U.S. PATENT DOCUMENTS

| 3,394,009 | 7/1968 | Knightly | 426/9 |
| 3,692,534 | 9/1972 | Ueno et al. | 426/9 |
| 4,346,118 | 8/1982 | Islam | 426/335 |
| 4,508,737 | 4/1985 | Forest et al. | 426/335 |

FOREIGN PATENT DOCUMENTS

| 46-24265 | 4/1968 | Japan | 426/335 |

Primary Examiner—R. B. Penland
Attorney, Agent, or Firm—Klarquist, Sparkman, Campbell, Leigh & Whinston

[57] ABSTRACT

This invention relates to the preservation of high moisture animal feeds which utilize a fermentation (either natural or induced) to improve the quality of the animal food. More specifically, this invention utilizes dimethyl fumarate (DMF) in plant feeds in combination with fermentation microorganisms to produce an animal feed which is high in nutrient value and low in spoilage microorganisms.

10 Claims, 2 Drawing Sheets

INFLUENCE OF DMF ON ACTIVITY IN SILAGE

PRESERVATION OF FEED

BACKGROUND OF THE INVENTION

"Silage is the material produced by the controlled fermentation of a crop of high moisture content": (*Chemistry and Biochemistry of Herbage*, edited by G. W. Butler and R. W. Bailey, Academic, Press, London and New York, Vol. 3, 1973, pp. 33-37, Chapter 28 entitled "The Ensilage Process", authored by P. McDonald and R. Whittenbury). Fermentation of silage incudes production of organic acids by bacteria, often Lactobacillus which are naturally present on fresh herbage or due to direct addition of Lactobacillus, or addition of acids or other preservatives. Herbage, for purposes of this application, is used to refer to all crop materials which are fermented into silage. Only preservatives which do not interfere with the desired Lactobacillus fermentation can be used in silage when the organic acids are produced by fermentation. Silage is an extremely high moisture product and is most efficiently stored in a hermetically sealed container.

Silage can be spoiled microbiologically under both aerobic and anaerobic conditions. If "oxygen is in contact with herbage which is being converted to silage, then aerobic microbial activity occurs and the material becomes a useless, inedible, and frequently toxic product" (Chemistry and Biochemistry of Herbage). Because oxygen often cannot be sufficiently excluded, it is desirable to utilize other means to prevent microbial spoilage. If anaerobic conditions can be produced, then spoilage may still readily occur due to "clostridial fermentation which leads to the production of carbon dioxide, ammonia and undesirable nitrogenous compounds such as amines". One way to decrease clostridial activity is to produce silage with 28% or more dry matter. However, silage as a final product often contains less than 28% dry matter and usually contains less than 28% dry matter when fermentation is initiated. In those cases where silage contains 28% or more dry matter, yeast and mold fermentation can still continue to occur, and Lactobacillus may grow in up to as much as 70% dry matter. This latter fermentation is desirable if it involves only Lactic acid producing bacteria since the lactic acid produced lowers the pH of the silage which acts to preserve the silage. The mold and yeast fermentations are undesirable as they produce spoilage. Similar spoilage problems due to mold and yeast fermentations exist for hay and mixed feeds which are often stored while containing more than 10% moisture.

The production of silage is, in itself, testimony to the need to preserve animal feeds. However, spoilage of silage is clearly contradictory to its reason for production. The wetter the silage the more difficult it is to preserve utilizing fermentation because the critical pH for preservation must be lower in those cases when silage is wetter. A standard method of preservation of hay today includes application of propionate compounds to the hay in amounts of 10 pounds per ton of hay which is 0.5%. However, propionates are not used in silage as they would interfere with the growth of Lactobacillus which are important for production of acids to lower pH. Thus, the compound which is known to preserve against spoilage organisms is also inhibitory to desirable organisms.

Maleic acid and fumaric acid and their esters have been known for a long time. In 1940, U.S. Pat. No. 2,218,181 to Searle and Tisdale describe the use of said esters for control of bacteria, fungi, and insects. They found the esters to have broad activity against such diverse organisms as *Fomes annosus, Ceratostomella pilifera, Penicillium digitaum*, mixed lumber molds, *Aspergillus niger, Penicillium expansu*, and *Bacillus mesentericus*. They found dimethyl fumarate (DMF) to be effective against bacteria and molds which decompose leather and proteolytic bacteria which attack dry casein powder. Further, in 1982, U.S. Pat. No. 4,346,118 issued to Mir N. Islam teaches that di-alkyl esters of fumaric acid have surprisingly strong antimicrobial activity with a broad spectrum against various microorganisms including bacteria, fungi, and yeast. Some bacteria inhibited by dimethyl fumarate in concentrations ranging from 0.001-0.01% are *Lactobacillus acidophilus, Lactobacillus casei* and *Lactobacillus plantarum* (lines 55-60, Col. 4, U.S. Pat. No. 4,346,118). These are the very type of microorganisms which produce silage (Chemistry and Biochemistry of Herbage).

Islam suggested that microbicidal amounts of di-alkyl esters of fumaric acid could be used to preserve a variety of "food", "feed" and "agricultural crops" including such agricultural crops as "cereal granis, legumes, oil seeds, nut seeds, dried fruits, tubers, root crops, silage, green wood (lumber), wood chips, wood pulp, canes; forage crops, flower bulbs; crop by-products such as citric pulp, apple pampas, almond hulls, etc." Addition of DMF to silage requires, by definition, that DMF be added after fermentation is complete. Without the fermentation being complete, a product cannot be called silage. DMF cannot be added prior to fermentation of herbage into silage (un-cured herbage), especially not in microbicidal concentrations, because DMF inhibits the desirable fermentation organisms. If the fermentation organisms are inhibited, then silage will not be produced. Islam (U.S. Pat. No. 4,346,118) shows that as little as 0.25 ounces of DMF per 100 pounds of flour which is combined with other ingredients (Table data, Example III, 1 35-45) to produce only 0.0029% DMF in bread, inhibits natural bread fermentation. In fact, an "initial 'sponge' dough was prepared omitting the preservative to facilitate (the desirable) yeast fermentation". In spite of this, there was still a fermentation inhibition. These findings are consistent with the teaching that 0.001-0.01% DMF inhibits silage fermentation organisms and must be added after the fermentation is complete to avoid inhibition of the desired fermentation.

Most examples in Islam U.S. Pat. No. 4,346,118 utilize 0.2% or more DMF, which is the concentration claimed in U.S. Pat. No. 4,346,118. The only example of lower concentrations used by Islam are as described above for bread or were used in a very short term study (48 hours) using plating media with a very dilute human infection mold inoculum. (Example XII-Column 12) These 48 hr data are not useful teaching for preservation of animal feeds for prolonged time periods (months and years) where ester hydrolysis degradation of DMF occurs and where a heavy mold "load" or infection occurs in a field and during harvesting.

Thus, it is clear that the di-alkyl esters of fumaric acid inhibit mold but could not be useful in un-cured herbage which is to be converted into silage by fermentation due to its reported bactericidal effects. Islam also points out that the concentrations at which di-alkyl esters of fumaric acid are applied to prevent fungus and mold growth depend upon the type of organic material being treated, its moisture content, the temperature and humidity and the period over which the preservation is desired. "The higher these parameters the greater would be the need for fungicide" (Column 5, lines 40–41). This may be why DMF can inhibit mold in bread in low concentrations, because baking not only lowers the amount of available water, but also kills mold such that the only source of mold for spoilage is the few spores that fall on bread during packaging or after being opened. In silage where humidity is extremely high, the spoilage organism "load" is very high from the field, and storage periods are quite long (months or even years). The writings of Islam teach that high concentrations of di-alkyl esters would be needed for preservation, perhaps up to 10% by weight of the material being treated (Col. 5, lines 35–43), and addition would have to occur after fermentation from herbage into silage is complete.

The broad spectrum anti-microbial activity of esters of fumaric acid is further suggested by two other publications. Gershom and Shanks ("Antifungal Properties of 2-Bromo-3-Fluorosuccinic Acid Esters and Related Compounds", Journal of Medicinal Chemistry, 1977, Vol. 20, No. 4, pp 606–609) shows that a variety of esters of fumaric acid are inhibitory to a variety of molds and yeast. Sahajawalla and Ayres reported that dimethyl fumarate inhibited all species of yeast, bacteria and molds against which it was tested in their effects to develop a new antimicrobial substance for use in people. Some of the organisms inhibited include a *Streptococcus mutans* and *Streptococcus sanguis* which are part of the Streptococcus family important in silage fermentation. (American Association of Pharmaceutical Scientists, First National Meeting and Premiere Exposition, The Washington Hilton, Washington, D.C., Nov. 2-6, 1986, abstracts of contributing papers, page 92S, No. 210). They further reported that dimethyl fumarate is not stable in aqueous environment. In water at 85°, DMF degraded completely within a week, and only 72% DMF remained intact at 45° at the end of 8 weeks. In the presence of enzymes, DMF was even less stable with 50% degrading in less than 3 hours in human plasma and in less than 10 minutes in rabbit blood. In vaginal secretions 50% degraded in 21 hours and in normal saline solution (which does not contain enzymes but does contain dissolved salts) 50% was degraded in 53 hours. Thus, it is clear that these findings of DMF instability in aqueous environment are consistent and compatible with the report of Islam that the efficacy of di-alkyl esters of fumaric acid depend upon the moisture content, temperature, humidity, and period over which preservation is desired.

We have now unexpectedly discovered that dimethyl fumarate (DMF) can be applied to high moisture hay or grains or other herbage prior to fermentation into silage by Lactobacillus or Pediococcus or Streptococcus or other microorganisms added or naturally present, with the DMF in sufficiently high concentrations which have been reported to inhibit silage producing microbes, but never-the-less the silage fermentation unexpectedly does occur; and the DMF is in a concentration expected to be too low to inhibit spoilage in these high moisture feeds but spoilage of the silage by molds and yeasts is unexpectedly prevented for long periods of time. Greater than 15% moisture would certainly be expected to degrade dimethyl fumarate and decrease its effect as reported by Islam (U.S. Pat. No. 4,346,118).

High moisture refers to 15% moisture or greater for this invention. Silage often contains 45–80% moisture.

Islam (Inhibition of Mold in Bread by Dimethyl fumarate, Journal of Food Science, Vol. 47, 1982, pp 1710–1712) points out that the safety of dimethyl fumarate for use as a food additive must be established before it can be used in foods for people. The degradation products of dimethyl fumarate are fumaric acid and methanol. While fumaric acid is safe in humans, methanol is a relatively toxic compound. However, in ruminants, methanol is a normal constituent of the ruminant contents and varies from about 23–28 mg/ml on average (occasionally exceeding 100 mg/ml) in cows (Ruminant Methanol In Vivo and In Vitro, Journal of Dairy Science, Vol. 53, No. 10, pp 1511–1514). The methanol is normally present due to enzymatic breakdown of pectin in both hay and grain. Since the ruminant content of a medium size cow is about 40 gallons (160 liters), that would be about 4,000 mg on average up to 16 grams (in some cows) of methanol. For a 400 kg cow, that would be a "dose" of 10 to 40 mg/kg of methanol normally present at the exact moment the concentration of methanol in the rumen was determined. This is however, only a very small fraction of the methanol actually produced in the ruminant since it is metabolized rapidly by methanol utilizing bacteria present in the ruminant. Two of these bacteria are *Eubacterium limosum* and Methanosarcina ("Features of Rumen and Sewage Sludge Strains of *Eubacterium Limosum*, a Methanol- and $H_2CO_2$-Utilizing Species", Genthner, Davis, and Bryant, Applied Environmental Microbiology, Jul. 1981, page 12–19). Thus, silage or feed containing dimethyl fumarate for a 400 kg heifer who would eat about 9 kg of feed per day as dry matter (Nutrient Requirements of Dairy Cattle, Nutrient Requirements of Domestic Animal, National Academy of Sciences, 5th revised addition, 1978, pp 30–34) would produce a very small amount of methanol compared to the methanol normally present. Thus, although there may be some concern for introduction of dimethyl fumarate into foods to be consumed directly by humans, introduction of dimethyl fumarate into the food chain as an additive on ensilage wherein the dimethyl fumarate would be converted to fumaric acid and methanol is no problem, and may be beneficial to the ruminant. In the ruminant, there is no concern for safety because the end products are fumaric acid which is nontoxic in either animals or people and methanol which is rapidly cleared to nontoxic carbon dioxide by the bacteria present.

OBJECTS OF THE INVENTION

Accordingly, the object of this invention is to provide a method of treating herbage such as hay and grain and other high moisture agricultural crops with dimethyl fumarate in the presence of desirable fermentation microorganisms wherein the combination produces an inhibition of spoilage microorganisms without substantial inhibition of the desirable microorganisms. This combination has not been previously suggested or recognized and, in fact has been taught against.

DESCRIPTION OF THE INVENTION

The present invention is based on discovery that dimethyl fumarate is effective to prevent the growth of mold on herbage fermented into silage and other high moisture animal feeds when combined with fermentation organisms prior to the fermentation and DMF does not stop the desired fermentation. It has been known that the di-alkyl ester of fumaric acid (dimethyl fumarate) does have a broad spectrum of activity against a variety of microorganisms including fungi and bacteria. However, DMF is now found to be effective against mold and to simultaneously not be inhibitory to bacteria utilized in production of silage, even though the DMF concentration is in a range previously reported to inhibit the desirable fermentation bacteria while being present in concentrations 4 to 10 times smaller (or even less) than has previously been shown to be useful for inhibition of mold on agricultural feeds. This is, of course, of great economical impact and practical value since raw material and production costs can be reduced dramatically for each ton of feed preserved.

EXAMPLE 1

The following experiment was conducted in order to test the effectiveness of DMF in preventing mold growth on high moisture hay.

Processed hay was tested for moisture (oven dry) and sufficient water added to produce a total moisture of 22%. The hay was then dispersed in equal quantities into petri dishes. The dishes were then randomly divided into test and control lots. A quantity of 0.5 ml of ethanol was then added to the control dishes and 0.5 ml ethanol with sufficient dimethyl fumarate to equal one part per ten thousand parts of hay into the treatment dishes. This is 0.01% of the wet weight of the hay, or only 1/20 of the claim of U.S. Pat. No. 4,346,118 as being useful for inhibition of mold.

All treatments of the wet hay were then put into a humidity cabinet at a temperature of approximately 86° F. After two weeks at this temperature the petri dishes were examined for mold. With the high humidity, high temperature, free hay enzymes and low DMF concentration, it would come as no surprise to find prolific mold growth. Results of this examination showed that all the control specimens contained obvious mold by the 14th day whereas the DMF treated specimens were surprisingly free of mold.

Figure 1:
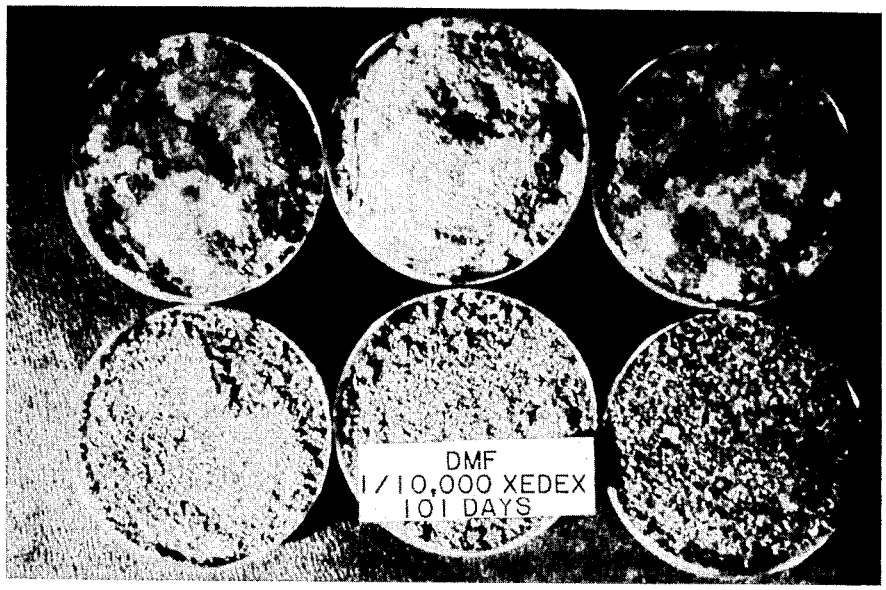
FIG. 1 is a photograph of petri dishes showing relative mold growth of test and control samples.

The petri dishes of hay were than put into a metal can and sealed to prevent evaporation. The samples were allowed to stand at 40° F. for over 100 days. A photograph was then taken of the test and control dishes (FIG. 1) after 101 days total storage.

Inspection of the photograph discloses that all control samples were heavily molded but the DMF treated samples remained mold free for this extended period of time in spite of carefully maintained high moisture. It was not expected that such small quantities of DMF would be able to inhibit mold over this extended period of time. For comparison, raisins which contain a natural mold inhibitor, containing only 17% water and prunes with only 18% water which were treated with 0.5% DMF solution (50 times more concentrated DMF) molded in less time (86 days and 97 days respectively [U.S. Pat. No. 4,346,118, column 8, lines 50–55]).

This example shows that high moisture hay can be preserved with DMF which is at least 10 times less concentrated than previously known. Higher amounts such as 0.05% would certainly also be effective in this case (as shown in a later example), which is still quite unexpected as it is only ¼ to 1/10 of what is previously known. A substantial savings is involved if 0.05% is used rather than 0.2% since application to hay can involve application to thousands of tons. A lower limit of DMF effectiveness can be determined using the techniques of this example and sequentially decreasing the amount of DMF used. Hay (alfalfa, clover, grass) is more than 80% moisture when it is first cut and must be dried to prevent spoilage. After the hay is cut and while it is drying, some multiplication and fermentation occurs for the organisms naturally present to produce organic acids which are helpful in hay preservation. In many field conditions it is not possible to dry hay fast enough to prevent mold. If hay becomes too dry the high protein leaves fall off and are lost in the field. If hay is too wet, it may spontaneously combust. Thus, the findings of this example have great economic and practical significance in preventing spoilage and allowing collection while there is sufficient moisture present to retain leaves.

This example shows that DMF can be applied to a high moisture feed such as hay in concentrations of only 0.01% or less and inhibit spoilage by mold. Later examples show that even 0.05% DMF unexpectedly does not substantially inhibit those Lactic organisms naturally present on hay whose fermentation products (organic acids) are beneficial. Thus, this example in combination with the later examples teaches that concentrations of 0.05% DMF or less can be applied to hay while it contains high moisture and the activity of desirable fermentation organisms present will not be stopped and there will be a preservation effect.

EXAMPLE 2

Field Test

A sample of DMF was ground to a fine powder and mixed with rice bran and charcoal (a commercial formulation "extender" called Total-X, manufactured by Charles Ledbeater Co. of Arkansas, USA., at the rate of ¼lb DMF to 3 lbs extender. This extended DMF product was then applied to fresh green moist hay at a rate of 1 lb mixture per ton. Thus the quantity of DMF added per ton was ¼lb or 0.0125%. Fresh cut hay has a moisture content of >80% and after field drying the moisture content of the hay was still between 16 and 23%.

Approximately ten (10) tons of hay were treated in this manner and compared with the extent of molding on non-treated hay from the same field and time. Location of this test was near Des Moines, Iowa and the test was under the supervision of Triple F Feed Company.

Results of this experiment were not photographed but it can be reported that the treated samples showed a dramatic reduction in apparent mold as compared with control samples. There was less darkening, less visible mildew, less heating and less moldy aroma in the treated hay bales in every instance. Retention of leaves was excellent.

These results would not have been expected as concentrations of 0.2% or more are considered necessary for control of mold in hay. Concentrations of DMF in this study were held to about one part in ten thousand or 0.01%, or one 20th of 0.2%. This example shows a process for preserving against spoilage by mold of an animal feed product initially containing high moisture by incorporation of about 0.01% of dimethyl fumarate, such an amount being significantly less than is expected to be effective, especially in light of the moisture content, temperature, humidity and period over which the preservation is desired. The utility of this new finding is apparent as using less DMF presents an obvious financial savings. In fact, when considering the large quantities of hay involved, using 0.05% which is also effective (as shown in Example 3) and much less than has previously been known to work in hay also represents a major useful finding.

An additional advantage associated with this usage of DMF is that we have unexpectedly discovered that such DMF can be used and growth of lactic acid bacteria which contribute an additional preservative effect, can also occur. Silage fermentation organisms are also now shown to proliferate even in the presence of 0.05% DMF (See Example 3). Combination of these examples shows that under commercial field conditions with initially high moisture hay and a heavy mold load that concentrations of DMF of only 0.01% or less are effective for inhibiting mold and mildew spoilage of hay. Now that this unexpected finding is known, those skilled in the art can easily determine the minimum concentration of DMF needed. This example further shows, in combination with example 3, that even in the presence of as much as 0.05% DMF, fermentation to produce desirable organic acids can occur during drying due to an unexpected and desirable lack of anti-bacterial action of DMF on the acid producing bacteria present.

EXAMPLE 3

Figure 2:
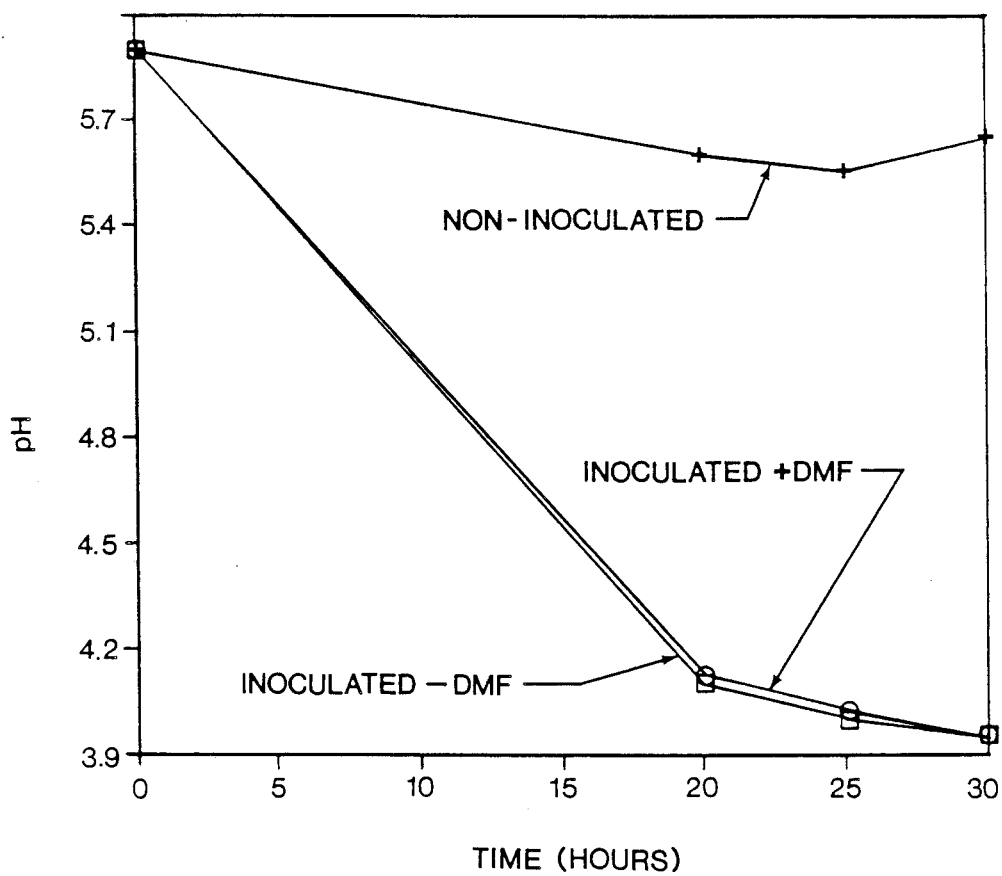
FIG. 2 is a graph showing the relative activities of a silage inoculant (*L. plantarum, P. acidilactici, S. faecium*) in the presence and absence of dimethyl fumarate 0.05% in an alfalfa/corn mixture having a moisture content of 65%.

Dimethyl fumarate was added to isopropyl alcohol-1:20. This mixture was then added to a herbage mixture (dry) of dehydrated alfalfa and ground corn flour-1:10. A similar alfalfa-corn mixture was treated with isopropyl alcohol without DMF. These dry mixtures were allowed to stand at 40° C. for 48 hours to evaporate the alcohol. Thus, DMF was 0.05% of the feed mixture. The above mixtures were then mixed with boiling water 1:2 so that the resulting water level was about 66%. Approximately 100 gram of each mixture was then incubated for conversion into silage in a beaker at 34° F. for a total of 30 hours. Acid production (pH) levels were measured at 20-24 and 30 hours. Prior to incubation, two of the wet herbage samples were inoculated with a commercial silage inoculant containing $L.$ $plantarum$, $P.$ $acidolactic$, and $S.$ $faecium$. FIG. 2 shows there was no significant inhibitory effect of DMF on acid production. The pH dropped from about 5.8 to about 4.0 in 24 hours. Thus, the DMF can be added to high moisture herbage prior to its fermentation to silage and will not interfere with the desired fermentation. Without culture inoculation there was insignificant acid production.

These examples show that DMF can be added to hay or grain or mixed feed material in amounts previously reported to inhibit fermentation bacteria (that is 0.001-0.01%; see Islam) and higher (see Example 3) but the fermentation bacteria are unexpectedly not stopped as demonstrated by a normal pH drop due to fermentation. Note that 0.05% is 5 to 50 times higher than is previously reported to inhibit the silage fermentation organisms. A pH drop of only 0.5 pH units is important to inhibit some spoilage organisms which are known to be inhibited at pH 5.5 or below. However, some of the organic acids produced by these desirable fermentation organisms as well as other compounds they produce are inhibitory to spoilage even without any change in pH. Further, the DMF is substantially below the 0.2% claimed by Islam and is still shown to inhibit mold in complex, high moisture, highly contaminated feed mixtures. The effect of the DMF cannot be fully explained as one would expect it to degrade, but may be useful because of the combined fermentation effect. This explanation has not been proven and is not to be limiting on the invention.

While we have described and given examples of preferred embodiments of our invention, it will be apparent to those skilled in the art that changes and modifications may be made without departing from our invention in its broader aspects. We therefore intend the appended claims to cover all such changes and modifications as follow in the true spirit and scope of our invention.

We claim:

1. A process for preserving an animal feed product, the process comprising:
   addition of dimethyl fumarate to the feed product wherein the moisture content of the feed is 15% or more when the dimethyl fumarate is added and dimethyl fumarate is added in an amount effective to inhibit mold of at least 0.001% by weight of the feed; and
   allowing the feed product to ferment in the presence of the dimethyl fumarate wherein fermentation lowers the pH of the animal feed by at least 0.5 pH units or more, the dimethyl fumarate being present in an amount insufficient to prevent such fermentation.

2. A process of protecting an animal feed material by diminishing the growth of mold during storage of the feed, which comprises:
   incorporating in said feed dimethyl fumarate in an amount effective to inhibit mold of at least 0.001% of the weight of the feed; and
   fermenting the animal feed by a Lactobacillus, Pediococcus, Streptococcus, or Leuconostoc in the presence of the dimethyl fumarate additive such that the pH of the feed is decreased by 0.5 units or more, the dimethyl fumarate being present in an amount insufficient to prevent such fermentation.

3. The process of claim 1 or 2 wherein the animal feed product is hay, grain, or a mixture of hay and grains.

4. The process of claim 1 or 2 wherein the final product is a silage.

5. The process of claim 1 or 2 wherein the fermentation is a naturally occurring process as a result of the microorganisms naturally present on the herbage.

6. The process of claim 1 or 2 wherein the fermentation producing organisms are deliberately inoculated into the herbage.

7. The process of claim 1 or 2 wherein the dimethyl fumarate is added to the herbage while it remains in the field.

8. The process of claim 1 or 2 wherein the dimethyl fumarate is added to the herbage in a silo or other holding container as the herbage is prepared for fermentation.

9. A process for preserving a animal feed product initially containing 15% or more moisture, the process comprising:

addition of dimethyl fumarate to the feed product in an amount of 0.001%–0.05% by weight of the high moisture feed; and allowing the feed to ferment in the presence of the dimethyl fumarate such that the pH of the feed decreases by at least 0.5 pH units.

10. A process for preserving against spoilage by mold of an animal feed product initially containing 15% or more moisture, the process comprising incorporation of an effective amount up to about 0.01% of dimethyl fumarate by weight into the feed.

* * * * *